United States Patent
Kaplan et al.

[11] Patent Number: 5,835,620
[45] Date of Patent: *Nov. 10, 1998

[54] BOUNDARY MAPPING SYSTEM AND METHOD

[75] Inventors: Eran Kaplan, Holon; Opher Shapira, Tel Aviv; Yuval Harary, Emek Soreq; Daniel Hachnochi, Herzlia, all of Israel; Richard S. F. Scott, New York, N.Y.

[73] Assignee: Neuromedical Systems, Inc., Suffern, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 576,988

[22] Filed: Dec. 19, 1995

[51] Int. Cl.⁶ .................................................. G06K 9/00
[52] U.S. Cl. ........................ 382/133; 382/128; 356/387
[58] Field of Search .................................. 382/128, 129, 382/130, 131, 132, 133; 364/413.01; 128/632; 356/328; 359/376, 387; 348/180

[56] References Cited

U.S. PATENT DOCUMENTS

| | | | |
|---|---|---|---|
| 3,740,147 | 6/1973 | Kallet | 356/328 |
| 4,191,940 | 3/1980 | Polcyn et al. | 382/128 |
| 4,773,097 | 9/1988 | Suzaki et al. | 382/128 |
| 5,083,214 | 1/1992 | Knowles | 358/403 |
| 5,093,866 | 3/1992 | Douglas-Hamilton et al. | 382/133 |
| 5,159,398 | 10/1992 | Maekawa et al. | 382/133 |
| 5,172,421 | 12/1992 | Nakamura et al. | 382/141 |
| 5,216,596 | 6/1993 | Weinstein | 382/128 |
| 5,257,182 | 10/1993 | Luck et al. | 364/413.1 |
| 5,287,272 | 2/1994 | Rutenberg et al. | 364/413.01 |
| 5,544,650 | 8/1996 | Boon et al. | 128/632 |
| 5,566,249 | 10/1996 | Rosenlof et al. | 382/128 |
| 5,594,808 | 1/1997 | Shen et al. | 382/134 |
| 5,638,459 | 6/1997 | Rosenlof et al. | 382/133 |

*Primary Examiner*—Jose L. Couso
*Assistant Examiner*—Anh Hong Do
*Attorney, Agent, or Firm*—Renner, Otto, Boisselle & Sklar

[57] ABSTRACT

A method of mapping areas of a slide includes the steps of selectively illuminating the slide from a first light source oriented generally obliquely to the surface of the slide, obtaining a first image of the slide illuminated by the first light source, selectively illuminated the slide from a second light source providing generally scattered light, obtaining an image of said second image illuminated by the second light source, and generating a map of areas of significance based on the first and second images.

45 Claims, 3 Drawing Sheets

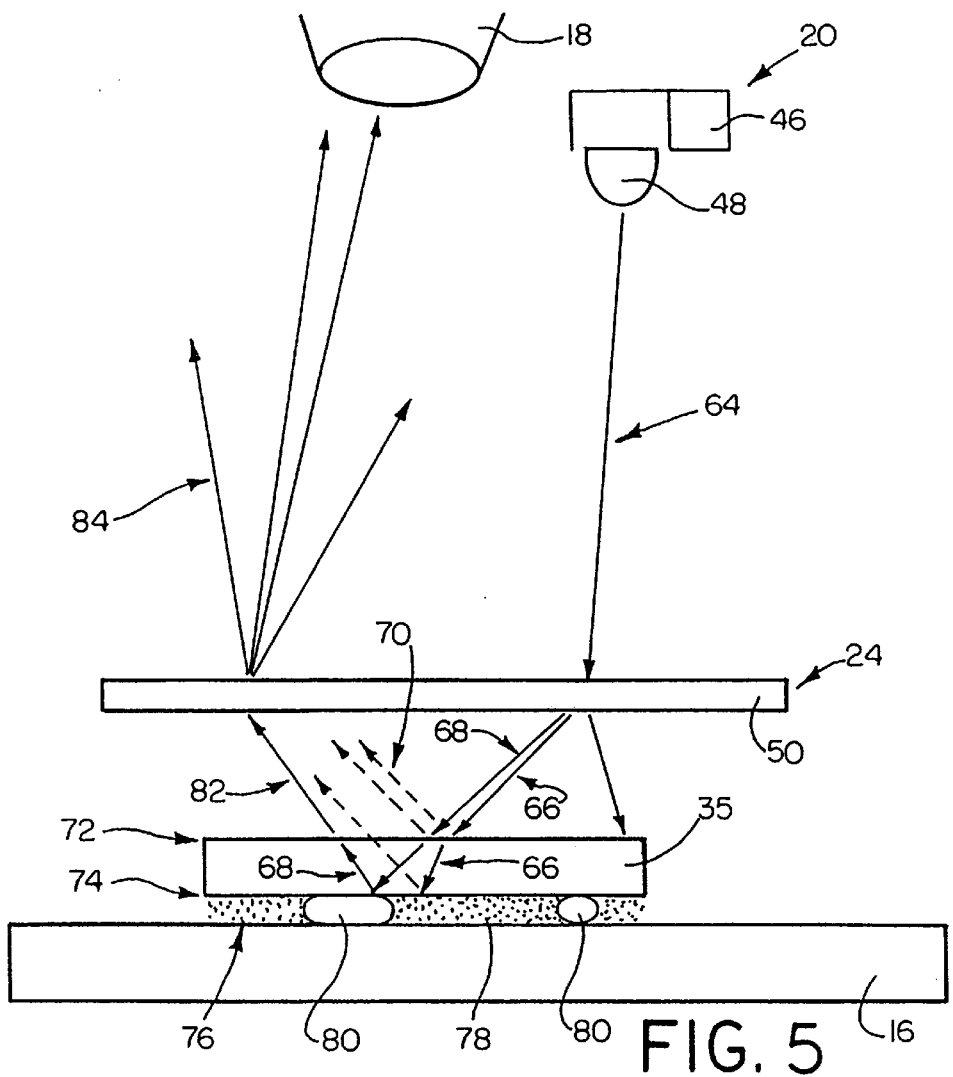
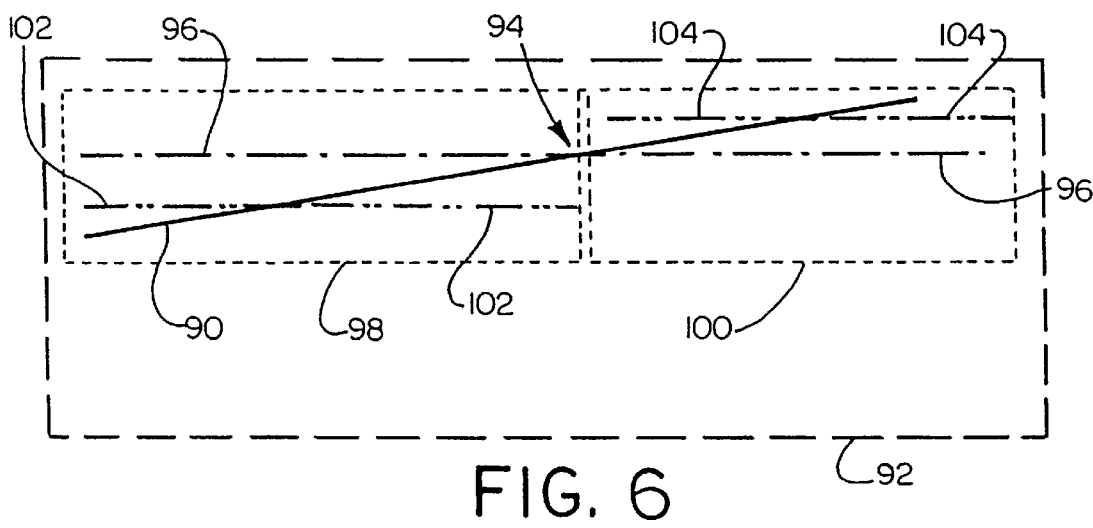

BOUNDARY MAPPING SYSTEM AND METHOD

FIELD OF THE INVENTION

The present invention relates generally to a system and method for obtaining images and detecting boundaries in the images, particularly, to a system and method for mapping boundaries of a specimen, and more particularly, to a system and method for mapping areas of interest on a slide such as areas lying within a coverslip and containing specimen material.

BACKGROUND OF THE INVENTION

In the medical industry a specimen is often affixed to a slide to perform a variety of tests and classification functions on the specimen using microscopy. In pathological analyses, for example, specimens, such as tissue sections, fluids and smears from different body sites are typically deposited on a slide and covered with a transparent coverslip or cover glass possessing the necessary optical properties for microscopy. The coverslip may serve to affix the specimen on the slide and/or may serve as a protective layer for the specimen or both. Unfortunately, it is difficult to accurately position the coverslip at a precise location on the slide. Moreover, air may become entrapped between the slide or specimen and the coverslip, forming undesirable inclusions or bubbles which interfere with viewing the specimen.

One pathological analysis using a slide is a Pap smear test. In a Pap smear test a sample of cellular material is smeared onto a slide, stained and then covered with a glass or plastic coverslip. The Pap smear is then analyzed using manual or automated microscopy for the presence of particular cells in the specimen, such as pre-malignant or malignant cells.

Particularly when performing an automated or semi-automated classification of a specimen on a slide, such as a Pap smear specimen, it is desirable to identify, or develop a map, of the areas of interest on the slide for which the classification is to be done. For example, it is beneficial to inform the classification system of the boundaries of the coverslip so that the classification functions are confined to areas of the slide containing matter to be classified. It is also desirable to inform the system of the location of air bubbles or similar inclusions so that these areas can be segmented from the analysis. This can reduce the processing time required of the system to analyze the specimen as well as possibly improve the accuracy of certain tests.

Presently, technicians manually map a slide by digitizing those areas of the slide that are occupied by the undesirable air bubbles and the edges of the coverslip so that these areas are not considered for evaluation by a processor or cyto-technician. The operator uses a digitizing pen to trace around the undesirable areas of the slide (i.e., air bubbles, air inclusions, scratches, and edges of the coverslip). This method of manually mapping the specimen has proven to be an effective method of preparing a slide for automated analysis. However, the present manual method is time consuming and expensive. It would thus be desirable to be able to automatically map the boundaries of a specimen.

SUMMARY OF THE INVENTION

The present invention provides a system and method of automated boundary mapping. The system uses a pair of light banks directing scattered or obliquely incident light on the slide to enhance air bubbles trapped under the coverslip and to detect the edges of the coverslip. A camera captures the images of the specimen and slide and a processing system then generates a boundary map of the areas of the specimen within the edges of the coverslip which are not obscured by air bubbles and the like. The system may also display the results of the mapping to enable a user to edit the mapping process.

In accordance with one aspect of the present invention, a method of mapping areas of a slide includes the steps of selectively illuminating the slide from a first light source oriented generally obliquely to the surface of the slide, obtaining a first image of the slide illuminated by the first light source, selectively illuminated the slide from a second light source providing generally scattered light, obtaining an image of said second image illuminated by the second light source, and generating a map of areas of significance based on the first and second images.

In accordance with another aspect of the invention, a slide mapping system includes a first light source oriented generally obliquely to the surface of the slide to create a first image, a second light source providing generally scattered light to the surface of the slide to create a second image, a camera for obtaining the first and second images, and a processor for generating a map of areas of significance based on the first and second images.

In accordance with another aspect of the invention, a slide mapping system includes a camera, a diffuser selectively positionable in a first position in the field of view of the camera and a second position outside of the field of view of the camera, wherein the camera obtains a first image of the slide when the diffuser is in the first position and a second image of the slide when the diffuser is in the second position, and a processor for generating a map of areas of significance based on the first and second images.

In accordance with another aspect of the invention, a slide mapping system includes a first light source oriented generally obliquely to the surface of the slide to create a first image, a second light source providing light to the surface of the slide, a diffuser for scattering light from the second light source reflected by the slide to create a second image, a camera for obtaining the first and second images, and a processor for generating a map of areas of significance based on the first and second images.

In accordance with a still another aspect of the invention, a method of displaying mapping information for a specimen includes the steps of generating a pixel intensity map of the specimen, determining locations of interest in the specimen, assigning pixels within the locations of interest one of either odd or even numbers, with the assigned number for each pixel representative of its intensity, assigning other pixels the other of either odd or even numbers, with the assigned number for each pixel representative of its intensity, and displaying the pixels, with the pixels having odd numbers assigned thereto being displayed with a different color characteristic than pixels having an even number assigned thereto.

In accordance with a further aspect of the invention a method of auditing the mapping information for a specimen includes the steps of generating a pixel intensity map of the specimen, determining locations of interest in the specimen, assigning pixels within the locations of interest one of either odd or even numbers, with the assigned number for each pixel representative of its intensity, assigning other pixels the other of either odd or even numbers, with the assigned number for each pixel representative of its intensity, displaying the pixels, with the pixels having odd numbers assigned thereto being displayed with a different color characteristic than pixels having an even number assigned thereto, and permitting an operator to change the pixel intensity map.

In accordance with a further aspect of the invention, a method of detecting the location of bubbles in a slide includes the steps of obtaining a first image of the slide illuminated under a first lighting condition, obtaining a second image of the slide illuminating under a second lighting condition, finding edges in the first and second images and combining the edges to form a third image, finding bounded areas defined by the edges in the third image, calculating a gray scale intensity average for each area in the second image corresponding to a bounded area in the third image, and comparing the calculated averages for each area to a threshold based on the gray scale intensity of a corresponding area in the first image.

In accordance with a further aspect of the invention a method of finding a line in an image formed of a plurality of rows and columns of pixels includes the steps of summing the intensity values for plural pixels in a row with the intensity values for previous pixels in the row and storing the sum for each of said plural pixels, comparing the stored sums for a plurality of said plural pixels in the same column to a threshold value, and estimating a point on the line as a function of the pixels having stored sums exceeding the threshold.

In accordance with still a further aspect of the invention, a method of finding a line in an image formed of a plurality of rows and columns of pixels includes the steps of summing the intensity values for plural pixels in a row with the intensity values for previous pixels in the row and storing the sum for each of said plural pixels, comparing the stored sums for a plurality of said plural pixels in the same column to a threshold value, estimating a first point on the line as a function of the pixels having stored sums exceeding the threshold, bisecting the image into plural subimages, obtaining the sums of the intensity values for plural pixels in a row within each subimage for a plurality of rows adjacent the estimated point, comparing the obtained sums to the threshold value, and estimating the location of additional points on the line as a function of the pixels having obtained sums exceeding the threshold.

In accordance with even a further embodiment of the invention, a method of auditing mapping information for an image includes the steps of displaying a first map of an image having areas of significance differentiated from other areas in the image, permitting an operator to change the areas of significance in the display, and generating a second map in accordance with the first map and any changes made by the operator.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 5 is a schematic diagram of the representative optical paths illustrating the formation of an image with bubble and inclusion information enhanced; and, FIG. 6 is a schematic illustration of an inventive bisecting operation to find coverslip edges in an image.

DETAILED DESCRIPTION OF THE INVENTION

Figure 1:
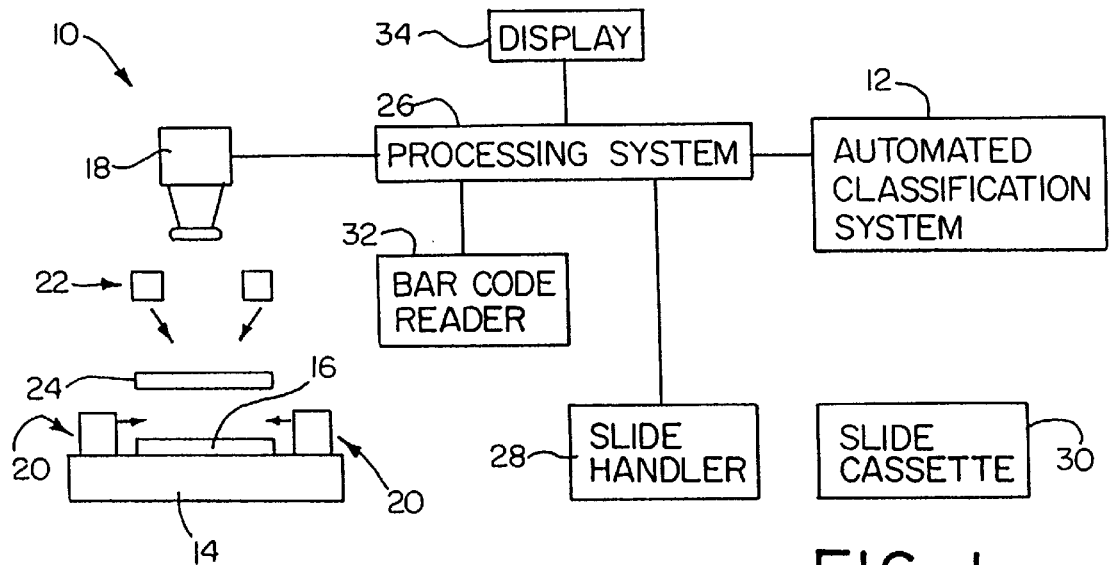
FIG. 1 is a schematic illustration of a boundary mapping system in accordance with the present invention and an automated classification system which uses the boundary map information generated by the boundary mapping system.

With reference to the several figures, and initially to FIG. 1, there is shown an inventive automated boundary mapping system 10 for providing boundary or mapping information, such as to an exemplary cell classification system 12. The mapping system 10 includes a stage 14 upon which a slide 16 to be mapped is placed, a camera 18, light banks 20 and 22, a diffuser 24 and a processing system 26 for developing the boundary map. The mapping system 10 may also include a robotic slide handler 28 for transferring slides between a storage cassette 30 and the stage 14, a bar code reader 32 for reading bar encoded information from the slide 16 and a display 34 to facilitate operator interaction and to permit auditing and editing of the mapping process.

As noted above, the slide mapping system 10 is particularly useful for providing information regarding the locations of specimen material on a slide to an automated or semi-automated specimen classifier. In such a context, the slide mapping information can be used by the specimen classifier to localize its classification functions to those areas on the slide where biological material is likely, thus possible reducing classification times. Moreover, by providing a map of the specimen on the slide, accuracy in placing the specimen and the coverslip on an precise area of the slide is not required and the specimen classifier can be used with specimen slides having coverslips of varying shapes and sizes. A number of exemplary specimen classification systems for which the mapping system 10 could provide mapping information are disclosed in co-owned U.S. Pat. Nos. 5,287,272; 5,257,182 and 4,965,725 and U.S. patent application Ser. Nos. 07/425,665; 07/502,611 and 08/196,982, the entire disclosures of which are incorporated by this reference. One commercial specimen classification system is produced by Neuromedical Systems, Inc.® of Suffern, N.Y. under trademark PAPNET®. However, it is noted that the mapping device of the present invention has a broad range of potential applications and is not limited to use with specimen classifiers or for use with slides, or slides with coverslips, these being but exemplary means of describing the inventive mapping system.

The light banks 20 and 22 and the diffuser 24 cooperate to produce different lighting conditions incident on the slide, each condition adapted to accentuate certain optical features and characteristics of the slide and thus to enhance detection of features such as inclusions, bubbles, and coverslip edges. Preferably the light banks 20 and 22 and the selective use of the diffuser 24 produce separate images of the slide for viewing by the camera 18, such as a first image (herein an edge image) in which edge information is enhanced and a second image (herein a bubble image) in which bubbles and similar inclusions in the specimen are enhanced.

An edge image is obtained by illuminating the slide 16 by the oblique light bank 20 which directs light to the slide at an angle parallel or nearly parallel to the top surface of the slide. The diffuser 24 is not used in obtaining an edge image and is thus rotated or otherwise moved out of field of view of the camera 18. The light from the oblique light bank 20 incident on the edges of the coverslip 35 tends to be scattered by the edges, and directed toward the camera 18 more than light incident on the top surface of the slide 16 or coverslip, as is discussed more fully below. This light captured by the camera 18 forms an edge image with the coverslip edges appearing somewhat brighter than the remainder of the image. The edge image is transferred to the processing system 26 which finds the edges in the edge image.

A bubble image is obtained by inserting the diffuser 24 into the field of view of the camera 18 adjacent the slide 16 and illuminating the diffuser with light from the overhead light bank 22 disposed above the slide and diffuser. The diffuser 24 scatters the light so as to be incident on the slide 16 from a variety of angles. Due to the refractive differences between the slide 16, the coverslip 35, the specimen material and an air bubble, light incident on an air bubble will tend to be reflected toward the camera 18 more than light incident on the specimen, as is discussed more fully below. Consequently, bubbles will appear brighter in the resulting bubble image than other information in the image. The bubble image is transferred to the processing system 26 where the bubble boundaries are found in the image. The bubble image also may include information on the location of scratches in the coverslip or inclusions in the specimen which are collectively referred to herein as bubbles.

Based on the detected coverslip edges and bubbles, the processing system 26 generates a boundary map indicating the areas of the specimen within the confines of the coverslip exclusive of bubbles. This boundary map is correlated to the identifying information for the slide 16 as read by the bar code reader 32 and recorded for use by the automated classification system 12. A series of boundary maps may be stored on recording media, such as a magnetic or optical disk for each slide 16 in the storage cassette 30 or a boundary map may be electronically transferred to the automated classification system 12 such as over a communication network. The classification system 12 may then use the boundary map to assist in classifying the specimen, such as by localizing the classification to areas of the specimen within a coverslip and not obstructed by bubbles, inclusions, scratches and the like.

Figure 2:
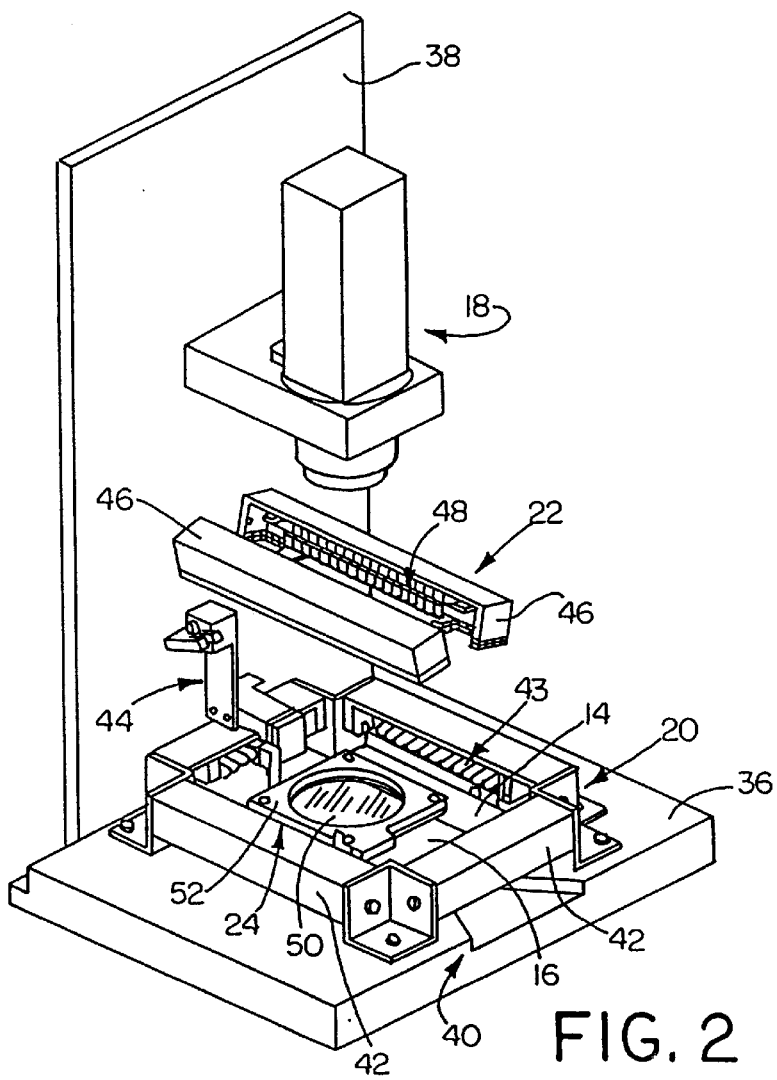
FIG. 2 is an illustration of the optical components of the boundary mapping system in position to generate an image in which edge information in the image is enhanced.

Turning then to FIG. 2, the optical components of the boundary mapping system 10 producing the edge and bubble images are shown in greater detail. The boundary mapping system 10 includes a base 36 and rear plate 38 upon which the various optical components of the mapping system are mounted. At the center of the base 36 is the stage 14 upon which a slide 16 to be mapped is secured. The stage 14 may be formed directly in the base 36 and adapted to facilitate automated placement and removal of the slide on the stage such as through the cutout section 40, or the stage may be a separate element mounted to the base. Preferably the stage 14 includes a positioning apparatus (not shown) for holding the slide 16 securely to the stage at a known position which is consistent with the position that the slide is held in the system to which the boundary mapping system 10 is providing mapping information, such as the exemplary cell classification system 12. A suitable positioning apparatus is described in copending U.S. patent application Ser. No. 08/498,321, which is incorporated herein by this reference.

Also mounted to the base 36 and oriented to project light to substantially the complete periphery of the slide 16 is the oblique light bank 20. The oblique light bank 20 preferably includes four separate light sources 42 placed adjacent each side of the slide 16 and slightly elevated above the slide to direct light towards the slide from an oblique angle nearly parallel to the top surface of the slide. The light sources 42 may include arrays of LEDs 43 or other suitable means for producing light.

Mounted to the rear plate 38 are the camera 18, the overhead light bank 22 and a diffuser assembly 44 which selectively positions the diffuser 24 in the field of view of the camera. The camera 18 is positioned directly above the slide 16 at a distance and with suitable optics to permit a full view of the relevant areas of the slide, such as the portions of the slide likely containing the coverslip and the specimen material. The camera 18 may be any of a variety of conventional cameras, such as a CCD camera, which alone or in conjunction with other components, such as an analog to digital converter can produce a digital output of sufficient resolution to allow processing of the captured images, for example an image having a resolution of 640×480 pixels.

Figure 3:
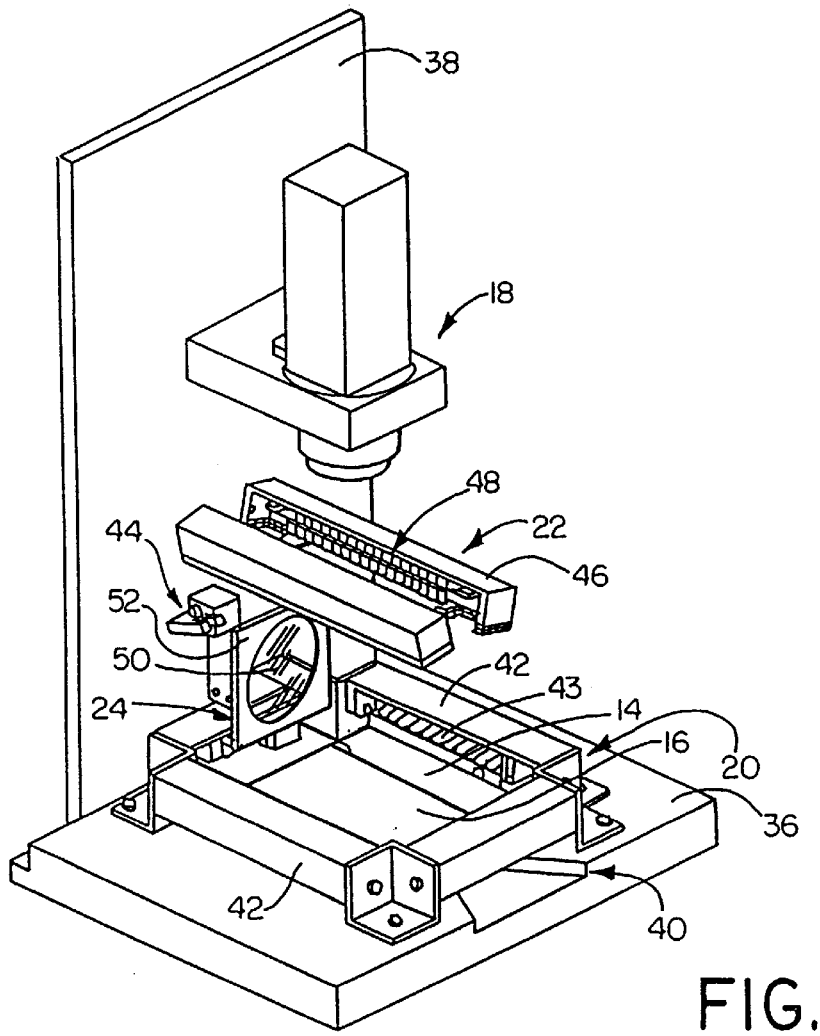
FIG. 3 is an illustration of the optical components of the boundary mapping system in position to generate an image in which bubble or inclusion information in the image is enhanced.

The overhead light bank 22 includes two separate light sources 46 located between the slide 16 and the camera 18 and spaced adjacent the optical path of the camera so as not to obstruct the camera's view of the relevant areas of the slide. The overhead light sources 46 preferably are arrays of LED lights 48, although other suitable light sources may be employed. The diffuser assembly 44 is positioned between the slide 16 and the overhead light bank 22 and is adapted to selectively position the diffuser 24 in the optical path of the camera 18. Consequently, light emitted from the overhead light banks 22 is scattered by the diffuser 24 toward the slide 16 and light reflected back from the slide is again scattered, with a portion being scattered toward the camera 18. The diffuser 24 includes a light diffusing element 50 which scatters incident light, such as a mylar sheet, and may also include a frame 52 supporting the light diffusing element. The diffuser assembly 44 includes an actuator (not shown) which selectively positions the diffuser 24 into a location, as shown in FIG. 2, slightly above the slide 16 and in the optical path of the camera 18 when a bubble image is to be obtained or out of the optical path of the camera, such as adjacent the rear plate 28, as shown in FIG. 3, when an edge image is to be obtained.

The conditions of the light banks 20 and 22, i.e., whether the light banks are generating light or not, the position of the diffuser 24 in or out of the optical path of the camera 18, and control of the camera, including the instructions to the camera to obtain an image of the slide 16, are controlled by the processing system 26 (FIG. 1). The processing system 26 is preferably a conventional microcomputer having suitable interfaces for controlling the light banks 20 and 22, the diffuser apparatus 44, the camera 18, the robotic slide handler 28 and bar code reader 30, as well as for receiving image data from the camera and slide identifying information from the bar code reader.

Figure 4:
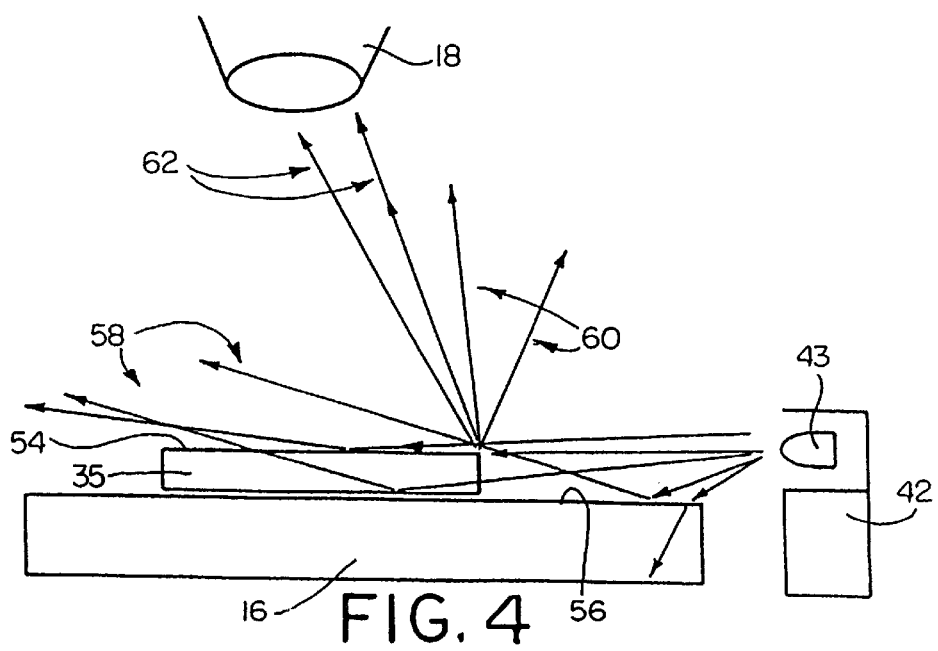
FIG. 4 is a schematic diagram of the representative optical paths illustrating the formation of an image with edge information enhanced.

In operation, once a slide 16 has been positioned on the stage 14 and with the diffuser 24 rotated out of the optical path of the camera 18, the processing system 26 instructs the light sources 42 of the oblique light bank 20 to illuminate the slide. This illumination of the slide 16 from the light sources 42 situated nearly parallel to the slide 16, as shown schematically for one edge of the coverslip in FIG. 4, results in predominately only light scattered by the coverslip edges being at least partly directed back to the camera 18. Since the light is incident on the top surface 54 of the coverslip 35 or top surface of the slide 16 from very oblique angles, the incident light, represented by rays designated by arrow 58, is predominately reflected at the angle of incidence and thus is not incident on the camera 18. As the coverslip edges tend to be relatively rough and thus scatter light, however, the light on the coverslip edges will be scattered, represented by rays designated by arrow 60, with a portion of the light, represented by rays designated by arrow 62, being scattered in the direction of the camera 18. Once the slide is illuminated by the oblique light bank 20, the processing system 26 will instruct the camera 18 to capture an image of the illuminated slide 16. Since predominately only the light scattered from the coverslip 35 or slide 16 edges is incident on the camera, the edges will appear brighter in the formed edge image than will other areas of the slide and coverslip. In some instances, such as when there are oxidized cells in an air bubble under the coverslip 35, the obliquely incident light may be scattered and reflected toward the camera, thus allowing for the detection of these occurrences from the edge image.

The processing system 26 then deactivates the oblique light bank 20 and instructs the diffuser assembly 44 to rotate the diffuser 24 into the optical path of the camera 18. The processing system 26 then activates the light sources 46 of the overhead light bank 22. The light generated by the overhead light bank 22 thus illuminates the slide 16 and coverslip 35, as shown in FIG. 5, through the diffuser 24. (It is noted that in FIG. 5, the diffuser 24 is shown at an exagerated distance from the slide 16 for illustrative purposes. The diffuser would preferably be located sufficiently close to the slide so that the lateral offset of the slide image as represented through the diffuser would not be significant.) The diffuser 24 scatters the light so as to be incident on the on the slide 16 and coverslip 35 from a multitude of angles. Considering an exemplary light ray 64, the ray from the light bank 20 is scattered by the diffuser 24 in many directions including those designated by rays 66 and 68. The exemplary rays 66 and 68 are partially transmitted into the coverslip 35 and a portion 70 is reflected at the air-coverslip interface 72. The portions of the rays 66 and 68 transmitted into the coverslip 35 are then either reflected at the interface 74 between the coverslip and the area 76 of either specimen material 78 or air bubbles 80 sandwiched between the coverslip and the slide 16 or are transmitted into the area 76 depending on the angle at which the rays approach the interface 74 and on the difference in the indices of refraction of the coverslip and the air bubble or specimen material. For a large difference in the indices of refraction between two mediums, such as between glass and air, more light is reflected at the interface between the mediums than is reflected at the interface between mediums having similar indices of refraction, like glass and the specimen material or other non-bubble containing areas (herein collectively referred to as specimen material).

Consequently, as the differences in the indices of refraction of the coverslip 35 and the specimen material 78 are relatively small, a very small portion of the light ray 66 is reflected at the interface and the majority is transmitted through the interface where it is substantially absorbed by the specimen material 76. However, at areas of the interface 74 between the coverslip 35 and an air bubble 80, since the differences in the indices of refraction are great, a large percentage of the light, such as ray 68, incident at the air bubble 80 is reflected back toward the diffuser 24, as designated by ray 82. Further, a large portion of the light which is transmitted through the interface 74 to the air bubble 80 is reflected back at the interface between the bubble and the slide 16 enhancing the reflection caused by the bubble. The light ray 82 reflected by the bubble 80 is again scattered by the diffuser 24, as represented by the rays 84, and a portion of these rays are incident on the camera 18, thus making bubbles appear brighter than the specimen material 78. The processing system 26 instructs the camera 18 to capture the bubble image of the illuminated slide 16 and the image is transferred to the processing system. The processing system 26 then returns the slide 16 to the storage cassette 30.

Once both images have been transferred to the processing system 26, the images are analyzed to find the coverslip edges and the bubbles lying within the coverslip edges as discussed more fully below. A boundary map is then generated of the areas of the slide 16 which may contain specimen material. Preferably the boundary map is a list of the locations, or identifications, of pixels in the image corresponding to non-bubble obscured areas within the coverslip edges, such as those areas likely to contain specimen material. The boundary map is then correlated with information identifying the slide to which it relates, such as through information supplied by the bar code reader 32, and stored for use by a system, such as the automated classification system 12, which can then limit its analysis to the pixels in the map indicating the likely presence of specimen material. Prior to the boundary map being transferred to the classification system 12, the operator is preferably given an opportunity to review the boundary map of a specimen and to confirm that the map appears to be accurate or to edit or reject the map.

The processing system 26 generates the boundary map by forming a coverslip mask and a bubble mask and then logically combining the maps to find the areas lying within the coverslip boundaries which do not represent bubbles. The coverslip mask is formed from the coverslip edges found in the edge image. The processing system 26 first removes artifacts from the edge image by subtracting a reference image from the original edge image. The reference image is obtained by capturing an image of the stage 14 with the slide removed using edge illumination used for obtaining an edge image. An intensity offset is added to the original edge image (to prevent the possibility of negative intensities after the reference image is subtracted) and the reference image is then subtracted from the original image to remove artifacts, such as scratches in the stage which might otherwise show up in the edge image. A number of preprocessing operations may then be performed on the resultant edge image to filter out short and curved lines as well as to thin the edges in the image. Using the filtered image, the remaining long, straight edges are found which lie within a certain windows at the left, right, top and bottom of the slide and are closest to the center of the image. By finding the straight line nearer the center of the slide, the coverslip edges are distinguished from slide edges.

The coverslip edges in each window are found using a repeatedly bisecting projection algorithm which finds an initial point which is likely to be proximate the center of the coverslip edge and then uses that point as the staring point for a further bisection of the image. The image is repeatedly bisected using the center point found in the previous bisection until the algorithm has focussed on a series of points over small discrete pieces of the coverslip edge which relatively accurately represent the coverslip edge.

To explain, consider the original and cumulative projection pixel images presented below as well as FIG. 6. (The original image corresponds to the filtered edge image, except that the gray scale intensities for each pixel have been represented as 1's and 0's as opposed to actual gray scale intensities for ease of explanation and ease of summation in the cumulative projection image. Further, the presented images are only a partial depiction of the larger number of pixels in the window image.) The original image represents the pixel intensities for the pixels in a window including the area wherein one horizontal coverslip and slide edge would lie. The top of the original image, in this example, is the distal edge of the edge image, with the lower portion of the image being the pixels closer to the center of the edge image. The cumulative projection image is a running summation of the intensity values for all pixels in the same row, i.e., at the same distance from the image edge, of the original image working from the left hand side of the image toward the right side and projected into a one-dimensional profile of the rightmost pixels. For example, the pixels in the first 9 columns of the first row in the original image all have zero intensities and thus the corresponding pixels in the cumulative projection image are all zero. As the pixels in columns 10 and 11 each have an intensity of one, the pixel in column 10 of the cumulative projection image would thus be one, or the summation of the previous nine pixels in the row and the pixel in column 10, and the value for the pixel in column 11 would the summation of the previous 10 pixels in the same row, namely one, plus the intensity of the 11th pixel in the original image for a sum of 2. As the intensities of the pixels in columns 12 and 13 of the original image are both zero, the corresponding pixels in the cumulative projection image will both have values of two, or the summation of the intensities for all pixels preceding them in the same row of the original image. The same summation is done for rows 2 through 8 to form the cumulative projection image shown below with the one dimensional profile being the rightmost column of pixels having the sums, from bottom to top, of 0, 3, 4, 5, 2, 0, 4 and 2.

Original Edge Image:

| 0 | 0 | 0 | 0 | 0 | 0 | 0 | 0 | 0 | 1 | 1 | 0 | 0 |
|---|---|---|---|---|---|---|---|---|---|---|---|---|
| 1 | 0 | 0 | 0 | 0 | 0 | 0 | 1 | 1 | 1 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 0 | 0 | 0 | 0 |
| 0 | 0 | 0 | 0 | 0 | 0 | 0 | 0 | 1 | 1 | 1 | 1 | 1 |
| 0 | 0 | 0 | 0 | 1 | 1 | 1 | 1 | 0 | 0 | 0 | 0 | 0 |
| 1 | 1 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |

Cumulative Projection Image:

| 0 | 0 | 0 | 0 | 0 | 0 | 0 | 0 | 0 | 1 | 2 | 2 | 2 |
|---|---|---|---|---|---|---|---|---|---|---|---|---|
| 1 | 1 | 1 | 1 | 1 | 1 | 1 | 2 | 3 | 4 | 4 | 4 | 4 |
| 0 | 0 | 0 | 0 | 0 | 0 | 0 | 0 | 0 | 0 | 0 | 0 | 0 |
| 0 | 0 | 0 | 0 | 0 | 0 | 0 | 2 | 2 | 2 | 2 | 2 | 2 |
| 0 | 0 | 0 | 0 | 0 | 0 | 0 | 0 | 1 | 2 | 3 | 4 | 5 |
| 0 | 0 | 0 | 0 | 1 | 2 | 3 | 4 | 4 | 4 | 4 | 4 | 4 |
| 1 | 2 | 3 | 3 | 3 | 3 | 3 | 3 | 3 | 3 | 3 | 3 | 3 |
| 0 | 0 | 0 | 0 | 0 | 0 | 0 | 0 | 0 | 0 | 0 | 0 | 0 |

To find a coverslip edge (for example, the edge 90 in FIG. 6) using the cumulative projection image, the profile for an initial search window 92 likely containing the edge is examined from the pixels closest to the center of the edge image working toward the outer edge for the first pixel which has a summation value exceeding a certain threshold. (The pixels in the profile are examined starting from the pixel closest the center to distinguish the coverslip edge from the slide edge since, as noted above, both edges are likely represented in the image and it is known that the coverslip edge will be closer to the center of the image than the slide edge.) A weighted average for this pixel and each pixel which follows until a pixel is encountered having a summation below the threshold is computed based on the summation value for each pixel above the threshold. If the threshold was 2.5, then the weighted average would be calculated for the seventh, sixth and fifth pixels from the edge in the profile, as these pixels have summation values of 3, 4 and 5, respectively. The weighted average is then taken as an assumed point 94 on the coverslip edge 90 in the center of the initial search window 92. The initial detected edge thus yields the initial assumed horizontal edge 96.

The cumulative projection image is then bisected into two search windows 98, 100, or subimages and the center point 94 found in the last calculation is used as the starting point for finding a new weighted average and new assumed edge 102, 104, for each of the subimages 98, 100, respectively, created by bisecting the previous image 92. These subimages 98, 100 are bisected and the bisected images again bisected in a repeating fashion until each image includes a relatively small number of pixels representing a relatively small distance in the original edge image. This way the detected edge can follow the actual edge 90 relatively accurately and can follow irregularities in the actual edge. It is noted that one advantage of using the cumulative projection image is that the profile for each subimage can be calculated by subtracting the intensity of the pixel in the cumulative projection image corresponding to the leftmost pixel in the subimage from the intensity of the pixel in the cumulative projection image corresponding to the rightmost pixel in the subimage rather than by performing redundant summations for each subimage. To fill in the gaps between the calculated coverslip edge points a least squares fit function or similar curve-fitting function can be used. Preferably, the predicted edge is checked to ensure that it is indeed a coverslip edge, such as by summing the portions of the profile adjacent the calculated coverslip edge for each of the last series of subimages and checking that the sum exceeds a threshold strength.

While the preprocessing operations noted above for removing short or curved lines from the edge image may include any of a number of well known, conventional morphological filtering operations, preferably a cumulative opening operation is performed on the cumulative projection image prior to application of the bisecting projection algorithm described above to result in an effect similar to a one dimensional morphological opening operation, i.e., erosion followed by dilation. For a horizontal edge the operation makes two passes over the rows of the cumulative projection image. On the first pass the operation scans from right to left, changing from positive to negative the cumulative sum at pixels corresponding to edge points which are to be removed from the image. As an example consider the rows illustrated below for an original and cumulative projection image. The pixels in the Cumulative Projection Row to be removed are those whose n-pixel sum in the original image is less than a predetermined threshold. For the example take "n" to be four and the threshold to be four as well. The n-pixel sum for each pixel in a row is determined by subtracting the nth pixel to the left of the current pixel in the Cumulative Projection Row from the value of the current pixel in the Cumulative Projection Row working from right to left. This has the effect of an n-pixel erosion, in this case a four pixel erosion. An n-pixel dilation, or in this case a four pixel dilation, is achieved by setting a counter equal to "n" whenever the n-pixel sum is greater than or equal to the threshold and decrementing the counter at each step to result in the Counter Row below. Where the Counter Row values are less than or equal to zero, the values at corresponding pixels in the Cumulative Projection Row are changed from positive to negative values to result in the Left-to-Right Pass Row below.

Original Row:

| 1 | 1 | 1 | 0 | 1 | 1 | 1 | 1 | 1 | 0 | 0 | 1 |
|---|---|---|---|---|---|---|---|---|---|---|---|

Projection Row:

| 1 | 2 | 3 | 3 | 4 | 5 | 6 | 7 | 8 | 8 | 8 | 9 |
|---|---|---|---|---|---|---|---|---|---|---|---|

Counter Row:

| -3 | -2 | -1 | 0 | 1 | 2 | 3 | 4 | 4 | -2- | 1 | 0 |
|---|---|---|---|---|---|---|---|---|---|---|---|

Left-to-Right Pass Row:

| -1 | -2 | -3 | -3 | 4 | 5 | 6 | 7 | 8 | -8- | 8 | -9 |
|---|---|---|---|---|---|---|---|---|---|---|---|

The second pass proceeds from left to right, calculating the new image by keeping track of the new cumulative sum and the error from the original cumulative sum. If the corresponding pixel in the Right-to-Left Pass is positive, the new output pixel for the Left-to-Right Pass equals the current pixel plus the error. If the corresponding pixel in the Right-to-Left Pass is negative, the new output pixel in the Left-to-Right Pass equals the previous output pixel current pixel in the Left-to-Right Pass and the current pixel in the Error Row is updated to be the previous output pixel plus the current pixel. As an example, as the leftmost pixel in the Right-to-Left Pass is "-1", therefor the leftmost pixel in the Left-to-Right Pass will be "0" as there is no previous error pixel, and the leftmost pixel in the Error Row is "-1" since there is no previous output pixel and the current pixel in the Right-to-Left pass is "-1". The second pixel in the Left-to-Right Pass will again be zero since the corresponding pixel in the Right-to-Left Pass is negative, "-2", and the previous Left-to-Right pixel is "0". The second pixel in the Error Row thus becomes "-2" since the previous pixel in the Left-to-Right pass is zero and the current pixel in the Right-to-Left Pass is "-2", and the sum of these values is "-2". The fifth pixel from the left in the Left-to-Right Pass (the first having a corresponding pixel in the Right-to-Left Pass which is positive) will be "1" since the value of the corresponding pixel in the Right-to-Left Pass is "4", the current pixel in the Error Pass is not updated and thus is "-3", and the sum of "4" and "-3" is "1". The remainder of the row is calculated in accordance with these examples.

Error Row:

| -1 | -2 | -3 | -3 | -3 | -3 | -3 | -3 | -3 | -3 | -3 | -4 |
|---|---|---|---|---|---|---|---|---|---|---|---|

Left-to-Right Pass Row:

| 0 | 0 | 0 | 0 | 1 | 2 | 3 | 4 | 5 | 5 | 5 | 5 |
|---|---|---|---|---|---|---|---|---|---|---|---|

The values in a Left-to-Right Pass Row are then substituted for those in a corresponding Cumulative Projection Image and edges are found in the image as described above.

Based on the coverslip edges found above, a coverslip mask is generated distinguishing the areas that lie within coverslip as determined by the four coverslip edges, from the areas that lie outside of the coverslip.

Next the processing system 26 forms the bubble mask based on the original bubble image as well as edges found in both bubble image and the edge image. First, the edge image is thresholded and the boundary pixels are found in the thresholded image to yield edges related to the coverslip and air bubbles containing oxidized cells which also show up in the edge image. These areas of oxidized cells, also known as cornflakes, may be separately recorded and provided to classification system.

Before the bubble image is analyzed by the processing system 26, artifacts in the bubble image are removed by subtracting a reference image from the original bubble image. The reference image is obtained by capturing an image of a blank slide without a coverslip using the bubble illumination technique used for obtaining the original bubble image, as described above, including the use of the diffuser 24. An offset is added to the bubble image before subtracting the reference image to ensure that the resultant image contains all positive pixel intensity values. The edges in the resultant bubble image are found using a conventional morphological edge detector and thresholding operation. These edges are combined with the edges found in the edge image to yield a combined edge image. As this image likely contains small gaps in the edges, a dilation operation is used to dilate the appropriate edges in all directions to close the gaps. As the combined edge image now includes a number of contiguous or connected areas defined and bounded by the connected edges in the image, these areas can be analyzed to determine whether they represent bubbles or specimen material.

To distinguish connected areas representing bubbles from those representing specimen material, an average gray scale intensity is determined for each of the connected areas using a histogram. Based on whether the average for each connected area exceeds one of two thresholds a determination is made as to whether the connected area is a bubble or contains specimen material. The threshold to apply to a particular connected area is determined by the brightness of the same area in the original edge image. As bubbles which contain oxidized cells appear bright in the original edge image, but do not appear as bright in the bubble image, a relatively low threshold is applied to the connected areas in the bubble image corresponding to bright areas in the original edge image to determine if the connected areas are bubbles. For connected areas which appear dark in the original edge image a relatively higher threshold is applied to distinguish whether the connected area corresponds to a bubble or to specimen material. The areas exceeding the applied threshold are determined to represent bubbles and thus form the bubble mask.

By logically combining the coverslip mask and the bubble mask, a boundary map of the areas of interest of the slide, i.e., the areas containing specimen material within the boundaries of the coverslip can be obtained.

In some cases it may also be desirable for the processing system 26 to develop and provide to the operator an indication of the degree of confidence of the processing system's generation of a valid boundary map so as to assist the operator in viewing only certain boundary maps for their accuracy. The confidence in the accuracy of the boundary map can be estimated using a variety of measures including: whether bright bubble areas have been found which lie outside of a coverslip edge, the error in the detected position of the slide from the calibrated position, the error in rotation of the detected position of the slide from the calibrated position, error in parallelism of the detected coverslip edges, whether bright areas have been detected in the image which are not contained within detected bubbles, the difference in the slide background from the calibrated background and the total bubble area detected. Other measures of confidence can also be used.

To allow the operator to review the boundary map, the processing system 26 generates a mapped image for display on the monitor 34. The mapped image is an image of the slide 16 which results from combining the bubble and edge images and essentially overlaying the combined image with a transparent overlay having colored areas, for example, greenish areas, indicating the areas to be excluded from the map sent to the classification system 12. The overlay is generated by assigning pixels corresponding to specimen material in the combined image a certain designator, such as making the gray scale intensities of these pixels all either an odd or an even number, and assigning pixels corresponding to areas to be excluded from the boundary map a different identifier, such as making the gray scale intensities of these pixels the other of either an odd or even number assigned to pixels corresponding to specimen material. For example, the intensity for each pixel in the combined image which corresponds to an area to be excluded from the map could be assigned a proximate even number and the intensity of each pixel in the combined image which corresponds to an area of specimen material in the map could be assigned a proximate odd number. Preferably each pixel intensity which must be changed, is changed by one to preserve the integrity of the intensity value for the pixel and thus the integrity of the overall image. Pixels being correctly odd or even without change, will, of course, not be changed. Considering as an example two pixels in the combined image, the first pixel corresponding to an air bubble in the combined image and having a gray scale intensity of 199 and the second pixel corresponding to specimen material and having a gray scale intensity of 150, the gray scale intensity of the first pixel will be changed to an intensity value of 200 to designate that the pixel corresponds to an area to be excluded from the boundary map and the gray scale intensity of the second pixel will be changed to 151 to designate that the second pixel corresponds to an area to be included in the map.

A look up table is then used to determine the red, green and blue intensities for each pixel in the display. The look up table is constructed with a red, green and blue intensity for each of the possible gray scale pixel intensities, for example, 256 gray scale intensities. In the look up table, the odd number gray scale intensities are all assigned individual red, green and blue intensities which are equal and correspond to the input gray scale intensity. The even number gray scale intensities are assigned red and blue intensities of zero and a green intensity corresponding to the input gray scale intensity. Accordingly, for a pixel corresponding to specimen material and having an odd number gray scale pixel intensity input of 151, for example, the look up table will provide red, green and blue outputs each of 151. For a pixel corresponding to an area to be excluded from the boundary map, such as an air bubble, and having an even gray scale pixel intensity input of, for example, 200, the look up table would provide red and blue output intensities of zero and a green intensity of 200.

Consequently, the areas of the mapped image which are to be passed to the classification system 10 as part of the boundary map are displayed on the display 34 in black and white and areas to be excluded from the map, such as areas located outside of the coverslip and areas containing a bubble, appearing with a greenish hue. Since the gray scale intensities of pixels need only be changed by one to make the intensity an odd or an even number, the relative intensities of the pixels in the mapped image are substantially maintained thus permitting an operator to view the image and reliably judge the accuracy of the boundary map as well as to edit the map if necessary. Editing of the boundary map can be accomplished through use of a light pen, a mouse or other suitable interface which allows the operator to indicate to the processing system 26 areas to include in the map or to exclude from the map.

What is claimed is:

1. A method of mapping areas of a slide, comprising the steps of:
    a) selectively illuminating the slide from a first light source, wherein light from the first light source is directed generally obliquely to the surface of the slide;
    b) obtaining a first image of the slide illuminated by the first light source;
    c) selectively illuminating the slide from a second light source through a diffuser to provide generally scattered light;
    d) obtaining through the diffuser a second image of the slide illuminated by the second light source; and
    e) generating a map of areas of significance based on the first and second images.

2. The method of claim 1, wherein step of illuminating the slide from a first light source includes illuminating from plural sides of the slide.

3. The method of claim 1, wherein step of illuminating the slide from a second light source includes positioning a diffuser between the second light source and the slide when the second light source is illuminating the slide and positioning the diffuser in a different a position when the first light source is illuminating the slide.

4. A slide mapping system for a slide having a coverslip, comprising:
    a first light source oriented generally obliquely to the surface of the slide;
    a second light source providing generally scattered light to the slide;
    a camera for obtaining a first image of light produced by the first light source that is reflected from the slide and for obtaining through a diffuser a second image of scattered light produced from the second light source that is reflected from the slide; and
    a processor for generating a map of areas of significance based on the first and second images.

5. The system of claim 4, wherein the diffuser is selectively in the field of view of the camera.

6. The system of claim 4, wherein the first light source directs light incident on the slide from plural sides of the slide.

7. The system of claim 4, wherein the first light source directs light incident on the slide from four sides of the slide.

8. The system of claim 4, wherein the light from the second light source is directed through a diffuser to scatter the light.

9. The system of claim 8, wherein the diffuser is selectively positionable between a position in the field of view of the camera and a position outside of the field of view of the camera.

10. A slide mapping system, comprising:
    a camera;
    a diffuser selectively positionable in a first position in the field of view of the camera and a second position outside of the field of view of the camera;
    wherein the camera obtains a first image of the slide when the diffuser is in the first position and a second image of the slide when the diffuser is in the second position; and
    a processor for generating a map of areas of significance based on the first and second images.

11. The system of claim 10, including a first light source oriented generally obliquely to the surface of the slide.

12. The system of claim 10, including a second light source oriented to direct light toward the slide through the diffuser when the diffuser is in the first position.

13. A mapping system, comprising:
- a first light source oriented generally obliquely to a surface of a slide to create a first image;
- a second light source providing light to the slide;
- a diffuser for scattering light from the second light source reflected by the slide to create a second image;
- a camera for obtaining the first and second images; and
- a processor for generating a map of areas of significance based on the first and second images.

14. The system of claim 13, wherein the diffuser is selectively positionable between a position in the field of view of the camera and a position outside of the field of view of the camera.

15. A method of displaying mapping information for a specimen, comprising the steps of:
- generating a pixel intensity map of the specimen;
- determining locations of interest in the specimen;
- assigning pixels within the locations of interest one of either odd or even numbers, with the assigned number for each pixel representative of its intensity;
- assigning other pixels the other of either odd or even numbers, with the assigned number for each pixel representative of its intensity; and
- displaying the pixels, with the pixels having odd numbers assigned thereto being displayed with a different color characteristic than pixels having an even number assigned thereto.

16. The method of claim 15, wherein the pixels within the locations of interest are displayed in black and white.

17. The method of claim 15, wherein the pixels outside of the areas of interest are displayed in a certain color.

18. The method of claim 15, wherein the pixels within the locations of interest are assigned an odd number.

19. The method of claim 15, wherein the pixels outside of the areas of interest are assigned an even number.

20. The method of claim 15, wherein the number assigned to a pixel is different from the gray scale intensity of the pixel by a visibly insignificant amount when the pixels are displayed.

21. The method of claim 18, wherein the number assigned to a pixel is different from the gray scale intensity of the pixel by a visibly insignificant amount when the pixels are displayed.

22. The method of claim 15, further including the step of permitting a user to edit the pixel intensity map.

23. The method of claim 15, wherein the step of generating a pixel intensity map includes the steps of:
- a) selectively illuminating a slide containing the specimen from a first light source wherein light from the first light source is directed generally obliquely to the surface of the slide;
- b) obtaining a first image of the slide illuminated by the first light source;
- c) selectively illuminating the slide from a second light source;
- d) obtaining a second image of the slide illuminated by the second light source; and
- e) generating a map of areas of significance based on the first and second images.

24. A method of auditing the mapping information for a specimen, comprising the steps of:
- generating a pixel intensity map of the specimen;
- determining locations of interest in the specimen;
- assigning pixels within the locations of interest one of either odd or even numbers, with the assigned number for each pixel representative of its intensity;
- assigning other pixels the other of either odd or even numbers, with the assigned number for each pixel representative of its intensity;
- displaying the pixels, with the pixels having odd numbers assigned thereto being displayed with a different color characteristic than pixels having an even number assigned thereto; and
- permitting an operator to change the pixel intensity map.

25. The method of claim 24, wherein the pixels within the locations of interest are displayed in black and white.

26. The method of claim 24, wherein the pixels outside of the areas of interest are displayed in a certain color.

27. The method of claim 24, wherein the pixels within the locations of interest are assigned an odd number.

28. The method of claim 24, wherein the pixels outside of the areas of interest are assigned an even number.

29. The method of claim 24, wherein the number assigned to a pixel is different from the gray scale intensity of the pixel by a visibly insignificant amount when the pixels are displayed.

30. The method of claim 27, wherein the number assigned to a pixel is different from the gray scale intensity of the pixel by a visibly insignificant amount when the pixels are displayed.

31. A method of detecting the location of bubbles on a slide, comprising the steps of:
- a) obtaining a first image of the slide illuminated under a first lighting condition;
- b) obtaining a second image of the slide illuminating under a second lighting condition;
- c) finding edges in the first and second images and combining the edges to form a third image;
- d) finding bounded areas defined by the edges in the third image;
- e) calculating a gray scale intensity average for each area in the second image corresponding to a bounded area in the third image; and
- f) comparing the calculated averages for each area to a threshold based on the gray scale intensity of a corresponding area in the first image.

32. The method of claim 31, wherein the first lighting condition includes illuminating the slide with obliquely incident light.

33. The method of claim 31, wherein the second lighting condition includes illuminating the slide with scattered light.

34. The method of claim 31, including the step of connecting gaps in the edges in the third image.

35. The method of claim 31, wherein the areas in the second image having calculated averages exceeding the relevant threshold are determined to represent a bubble.

36. The method of claim 31, wherein the areas in the second image corresponding to areas in the first image having a relatively high gray scale intensity are compared to a lower threshold than areas in the second image corresponding to areas in the first image having a relatively lower gray scale intensity.

37. A method of finding a line in an image formed of a plurality of rows and columns of pixels, comprising the steps of;
- a) accumulating the intensity values for plural pixels in a row with the intensity values for previous pixels in the row and storing the accumulated sum for each of said plural pixels;
- b) comparing the stored sums for a plurality of said plural pixels in the same column to a threshold value; and, c) estimating a point on the line as a function of the pixels having stored sums exceeding the threshold.

38. The method of claim 37, wherein the step of estimating includes performing a weighted average of the pixels and the stored sums.

39. The method of claim 37, including the step of using the estimated point to estimate the location of another point on the line.

40. The method of claim 37, including the further step of bisecting the image into plural subimages and using the estimated point to estimate the location of additional points on the line.

41. The method of claim 40, including the step of obtaining the sums of the intensity values for plural pixels in a row within each subimage for a plurality of rows adjacent the estimated point and comparing the sums to a threshold value.

42. The method of claim 41, wherein the step of obtaining the sums includes subtracting the stored sum for the pixel at one distal column of a subimage from the stored sum at the other distal column of that subimage.

43. A method of finding a line in an image formed of a plurality of rows and columns of pixels comprising the steps of:

a) summing the intensity values for plural pixels in a row with the intensity values for previous pixels in the row and storing the sum for each of said plural pixels;

b) comparing the stored sums for a plurality of said plural pixels in the same column to a threshold value;

c) estimating a first point on the line as a function of the pixels having stored sums exceeding the threshold;

d) bisecting the image into plural subimages;

e) obtaining the sums of the intensity values for plural pixels in a row within each subimage for a plurality of rows adjacent the estimated point;

f) comparing the obtained sums to the threshold value; and, g) estimating the location of additional points on the line as a function of the pixels having obtained sums exceeding the threshold.

44. The method of claim 43, wherein the step of obtaining the sums includes subtracting the stored sum for the pixel at one distal column of a subimage from the stored sum at the other distal column of that subimage.

45. The method of claim 43, wherein the step of estimating the location of additional points includes performing a weighted average of the pixels and the obtained sums.

* * * * *